United States Patent [19]
Young et al.

[11] Patent Number: 5,431,518
[45] Date of Patent: Jul. 11, 1995

[54] POLYMERIC COMBINATION WASHER AND NUT

[76] Inventors: Donald M. Young, 14707 Plano Ct., Rancho Murietta, Calif. 95683; Michael F. Mahoney, 184 E. 500 N., Provo, Utah 84606

[21] Appl. No.: 143,034

[22] Filed: Oct. 29, 1993

[51] Int. Cl.⁶ .................................................. F16B 37/14
[52] U.S. Cl. ...................................... 411/429; 411/908
[58] Field of Search ............... 411/429, 427, 337, 908, 411/907, 904, 301, 369, 542, 377

[56] References Cited

U.S. PATENT DOCUMENTS

| | | | |
|---|---|---|---|
| 425,786 | 4/1890 | Hansen | 411/429 |
| 919,034 | 4/1909 | Lamotte | 411/429 |
| 1,324,867 | 12/1919 | Wilson | 411/429 |
| 2,878,905 | 3/1959 | Langermeier | 411/908 |
| 3,273,441 | 9/1966 | Biesecker | 411/429 |
| 3,390,906 | 7/1968 | Wing | 411/427 |
| 4,717,302 | 1/1988 | Adams | 411/427 |
| 4,756,654 | 7/1988 | Clough | 411/429 |
| 4,883,399 | 11/1989 | MacLean | 411/908 |

FOREIGN PATENT DOCUMENTS

| | | | |
|---|---|---|---|
| 16052 | 10/1887 | United Kingdom | 411/427 |
| 797380 | 7/1958 | United Kingdom | 411/908 |

*Primary Examiner*—Flemming Saether
*Attorney, Agent, or Firm*—Frank D. Gilliam; John R. Duncan

[57] ABSTRACT

An integral nut and washer formed from a fiber reinforced polymeric material that is particularly useful for use in water tanks and the like that are bolted together from overlapping metal plates. The combination includes a generally cylindrical nut body having an internally threaded cavity, with a transversely extending washer portion around the opening. At least one pair of opposed flats are provided on the nut body for tightening the nut with a conventional wrench. An axial vent is provided at the closed end of the cavity to allow air or excess sealant, where sealant is used, to escape as the nut is tightened. The entrance into the threaded cavity is chamfered, and the washer portion is tapered back along the nut portion for maximum washer strength. Preferably, the integral nut and washer is formed from a glass fiber reinforced polyurethane material by injection molding. This nut is durable and does not corrode in use. It also eliminates rust streaks when used on the exterior of tanks and rust contamination when used on a tank interior.

19 Claims, 1 Drawing Sheet

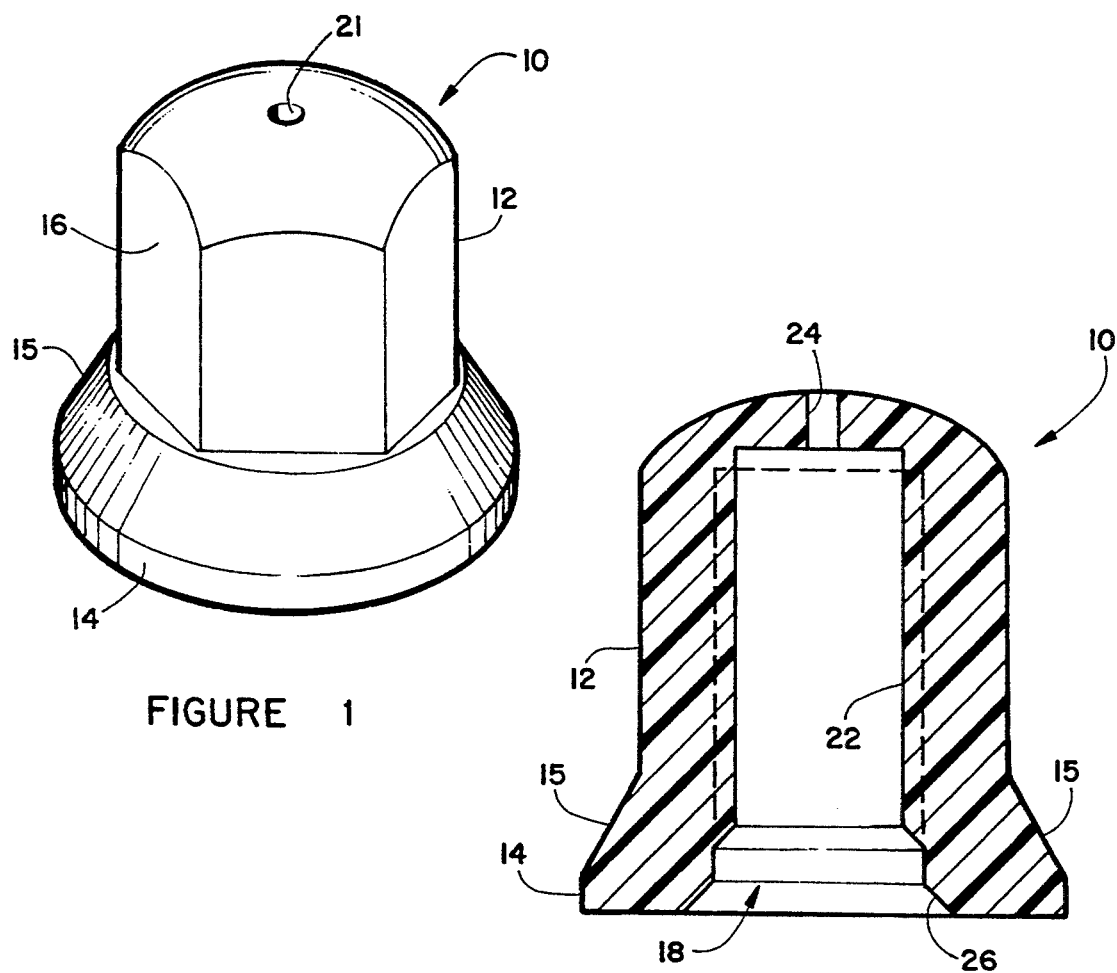
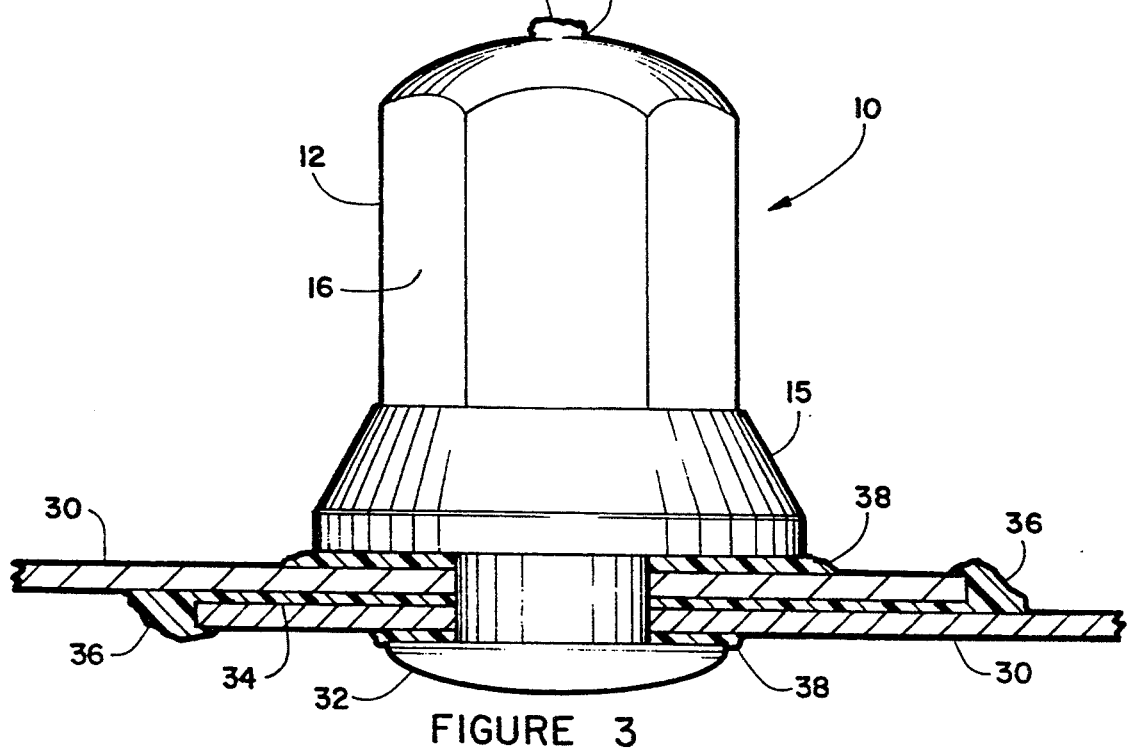

POLYMERIC COMBINATION WASHER AND NUT

BACKGROUND OF THE INVENTION

This invention relates in general to fasteners and, more specifically, to nut, washer and bolt combinations used to secure overlapping metal plates and the like together.

In the past, large metal structures such as steel water tanks or other large containers for powdered or granular material or corrosive liquids and gasses have been assembled from component parts and secured together in a variety of ways, including welding, rivet and bolts. While all of these are effective, welding and riveting on site require considerable equipment and highly skilled assemblers. Fastening with metal bolt, washer and nut combinations, using factory pre-drilled holes in overlapping plates, is often the fastening technique of choice. Generally, conventional steel bolts, nuts and washers are used, with in some cases a plastic cap placed over the nut.

For greater resistance to corrosion and resulting increased durability, improved appearance and reduced contamination of the contained material, glass enamel coated steel plates have come into increasing use. The use of the usual steel nuts, washers and bolts with these new coated plates has not been entirely successful. Tightening the bolts to the required torque may damage the glass coating. The metal components corrode, causing unsightly rust streaks on the tank exterior and may contaminate the tank contents.

Washers formed from elastomeric materials, such as are described by Fukushima et al. in U.S. Pat. No. 5,193,960 have been developed to reduce the localized stresses on the tank surfaces and to reduce or prevent leakage at the fastener. While helpful, these washers do not prevent the corrosion of the nut and the resulting streaking and contamination.

With tanks containing liquids or gasses, the bolt hole must be sealed against leakage. Similarly, where a dry powdered or granular material is stored, external liquids, such as rain, must be kept out of the storage structure. A variety of sealants or adhesives have been used. These tend to complicate installation, making threading a nut onto the bolt difficult. With cap-type nuts which are desirable to cover the exposed bolt end both from the point of view of leakage, bolt corrosion and appearance, excess sealant may prevent the nut from being fully tightened.

Installing the nut, washer and bolt assembly at each of often many thousand locations in a large structure is very time consuming. The need to hold a bolt in position in a hole, place a washer over the extended bolt end, then start the nut thread and tighten the nut to the required torque takes often results in installation problems. The washer may fall off the often short exposed bolt end and have to be retrieved and replaced, the nut may not start on the treads easily or may become cross-threaded.

Thus, there is a continuing need for bolt, washer and nut type fasteners for large structures, such as tanks, that can be easily, quickly and accurately installed, seal against leakage, reduce or eliminate corrosion and provide a pleasing appearance.

SUMMARY OF THE INVENTION

The above-noted problems, and others, are overcome by the combination nut and washer of this invention, which basically comprises a generally cylindrical nut body, an internally threaded cavity in the nut having an open end and a closed end, and a transversely outwardly extending washer portion integral with the nut body. The nut and washer portions are formed as a single unit from a high strength fiber reinforced synthetic resin polymer.

The nut body has at least two (preferably four or six) opposed flats on the sides of the body, each lying generally parallel to the body axis. A vent hole is preferably provided through the closed end of the cavity to vent air and any excess sealant, if a sealant is used.

The washer portion has a flat outer surface substantially perpendicular to the nut body axis and, preferably, an opposite surface that returns to meet the body at an obtuse angle to the body.

Any suitable polymer may be used for the integral combination of nut and washer. Preferred polymers include polyurethane, Nylon, polyester, and mixtures and copolymers thereof. Of these, best results have been obtained with polyurethane. Excellent results have been obtained with Isoplast urethane resins, such as Isoplast 101 LGF40, from the Dow Chemical Co.

Any suitable high strength fibers may be used to reinforce the polymer. Typical fibers include glass, aramids, graphite and boron fibers and mixtures thereof. Of these, the optimum combination of high strength, ease of use and low cost is obtained with glass fibers.

Any suitable method may be used for manufacturing the integral combination nut and washer of this invention. Depending on the polymer selected, the nut and washer combination could be machined from rod stock, could be molded from a thermoplastic or a B-stage thermoset material or could be injection molded. In general, injection molding is preferred for optimum product quality and lowest production cost.

Other additives may be included in the product, where suitable. For example ultraviolet absorbers and pigments may be used. Where the tank or other structure to be assembled is made from glass enamel coated steel, the nut and washer combination could be pigmented to match the color of the enamel.

BRIEF DESCRIPTION OF THE DRAWING

Details of the invention, and of certain preferred embodiments thereof, will be further understood upon reference to the drawing, wherein:

FIG. 1 is a perspective of an integral nut and washer combination according to this invention;

FIG. 2 is an axial section through the integral nut and washer of FIG. 1; and

FIG. 3 is a section through a pair of plates secured with the integral nut and washer of this invention, taken parallel to the nut axis.

DETAILED DESCRIPTION OF PREFERRED EMBODIMENTS

Referring to FIGS. 1 and 2, there is seen an integral nut and washer 10 having a generally cylindrical nut body portion 12 and an outwardly extending, flange-like, washer portion 14.

The nut body 12 has at least two opposed flats 16 on the exterior, each lying approximately parallel to the axis of nut body 12. Preferably, two or three pairs of opposed flats 16 are provided for use with conventional wrenches. Of course, any other external configuration suitable for use with other installation tools could be used, if desired.

A cylindrical cavity 18 extends from an open end to a closed end 20 of nut body 12. A conventional thread 22 is formed along the length of cavity 18. A vent hole 24 is provided at the closed end 20 to allow release of air or any excess sealant when the nut and washer combination is threaded onto a bolt. While a single axial vent hole is preferred, a plurality of vents could be provided around the closed end if desired. In order to allow easy threading of nut and washer 10 onto a bolt, a chamfer 26 is provided at the entrance to threads 22. Chamfer 26 will also capture some of the sealant that otherwise might be squeezed out, forming a sealant bead at the chamfer. Where a sealant is used, the threads cannot be easily seen or felt as nut installation is begun, so a relatively large chamfer, typically at least about 3 times the thread depth is preferred.

Washer portion 14 extends transversely of nut body 12 and provides a surface generally perpendicular to the nut body axis. The opposite side of washer portion 14 preferably includes a tapered side 15 extending from the outer edge of washer 14 toward the nut body at an obtuse angle to the nut body for optimum strength.

FIG. 3 shows a section view through a pair of steel plates 30 taken parallel to the axis of a nut and washer 10 installed thereon. A bolt 32 (only the head being seen) extends through alighted holes (not seen) in plates 30. The threads within nut body are threaded onto bolt 32, bringing washer portion 14 into engagement with the surface of upper plate 30 at a selected torque. Any suitable bolt configuration may be used with the nut and washer of this invention. Typically, bolts may be metal or polymeric. An excellent bolt is the Monel bolt having a head encased in a thick elastomeric coating, available from A. O. Smith Harvestore Products, Inc.

For optimum sealing and avoidance of any leakage past the bolt and nut or between plates 30, a sealant coating 34 is applied between plates 30, a bead 36, sealant is applied to the plate abutting surfaces of washer 14 and the head of bolt 32 and sealant is applied to the bolt threads and/or the nut threads. When nut and washer 10 is tightened, a small amount of sealant is forced out, forming small surplus beads 38 around the periphery of washer 14 and the head of bolt 32. In addition, a small amount 32 of sealant is forced out of vent hole 24. The appearance of this slight excess sealant assures optimum sealing of the assembly.

Any suitable sealant may be used. Typical sealants include polyurethanes, silicone resins, synthetic rubbers and mixtures and combinations thereof. For best results, a urethane sealant of the sort available from the Sika Corporation under the "Sikaflex" trademark.

The integral nut and washer of this invention, when used in an assembly of the sort described above provides an excellent seal that prevents tank contents from leaking out or exterior moisture leaking in when a dry product, such as grain, is stored in the structure. No corrosion of the nut assembly is possible, so that no rust streaks or the like can form on the structure surface.

Other applications, variations and ramifications of this invention will occur to those skilled in the art upon reading this disclosure. Those are intended to be included within the scope of this invention, as defined in the appended claims.

We claim:

1. A combination nut and washer which comprises:

a generally cylindrical nut body having a cylindrical axial cavity including an open end and a closed end;

an open axial vent hole extending through said closed end;

said cavity being internally threaded;

the exterior of said cylindrical nut body having a surface adapted to be griped by a tool for rotating said nut body;

a transversely outwardly extending washer portion integral with said body and adjacent to the open end of said cavity;

said washer having a flat outer surface substantially perpendicular to said body axis; and said integral nut body and washer portion being formed from a high strength synthetic polymer.

2. The combination nut and washer according to claim 1 wherein a transverse surface of said washer portion opposite said flat outer surface tapers from an outer edge toward said body at an obtuse angle to said body.

3. The combination nut and washer according to claim 1 wherein an edge of the open end of said cavity is chamfered, 4. The combination nut and washer according to claim 3 wherein said chamfer has a depth at least three times the depth of said threads, 5. The combination nut and washer according to claim 1 wherein said nut body exterior has a plurality of opposed flat areas each generally parallel to the axis of said nut body, 6. The combination nut and washer according to claim 5 wherein said generally cylindrical nut body exterior has from two to three pairs of opposed flat areas.

7. The combination nut and washer according to claim 1 wherein said integral nut and washer is formed from a synthetic resin polymer selected from the group consisting of polyurethane, Nylon and polyester and mixtures and copolymers thereof.

8. The combination nut and washer according to claim 7 wherein said integral nut and washer is formed by injection molding.

9. The combination nut and washer according to claim 7 wherein said polymer is reinforced with high strength fibers selected from the group consisting of glass, aramid, graphite, and boron fibers and mixtures thereof.

10. The method of securing metal plates together in an overlapping relationship which comprises the steps of;

forming aligned holes through an assembly of at least two overlapping metal plates;

coating the head portion of a bolt adjacent to the bolt shank with a sealant;

inserting said bolt through said holes from a first side of said assembly;

providing a combination nut and washer as described in claim 9;

coating the cavity thereof and said flat surface with said sealant;

threading said combination nut and washer onto said bolt to bring said flat washer surface against the second side of said metal plate assembly to a selected torque;

whereby said threads and said washer portion flat surface are coated with sealant and excess sealant is forced through said vent hole.

11. The method according to claim 10 wherein said sealant and said combination nut and washer each comprises a polyurethane resin.

12. The method according to claim 10 wherein said integral nut and washer is formed from a synthetic resin polymer selected from the group consisting of polyurethane, Nylon, polyester and mixtures and copolymers thereof.

13. The method according to claim 12 wherein said polymer is reinforced with high strength fibers selected from the group consisting of glass, aramid, graphite and boron fibers and mixtures thereof.

14. A combination nut and washer which comprises:
a generally cylindrical nut body having a cylindrical axial cavity having an open end and a closed end;
said cavity being threaded and having a chamfered open end;
the generally cylindrical nut body having a plurality of opposed flat areas parallel to the axis of said body;
an open axial vent hole through the closed end of said cavity;
a transversely outwardly extending washer portion integral with said body adjacent to the open end of said cavity;
said washer having a flat outer surface substantially perpendicular to said body axis; and
said integral nut body and washer portion being formed from a fiber reinforced high strength polymer.

15. The combination nut and washer according to claim 14 wherein said integral nut and washer is formed from a synthetic resin polymer selected from the group consisting of polyurethane urethane, Nylon and polyester polymers and mixtures and copolymers thereof.

16. The combination nut and washer according to claim 15 wherein said polymer is reinforced with high strength fibers selected from the group consisting of glass, aramid, graphite, and boron fibers and mixtures thereof.

17. The combination nut and washer according to claim 15 wherein said integral nut and washer is formed by injection molding.

18. The combination nut and washer according to claim 14 wherein a transverse surface of said washer portion opposite said flat outer surface tapers from the outer edge toward said body at an obtuse angle to said body.

19. The combination nut and washer according to claim 14 wherein said cylindrical exterior has from two to three pairs of opposed flat areas.

* * * * *